Nov. 11, 1941.   W. A. COONE   2,262,314
DEVICE FOR PRODUCING VENTHOLES IN CANS OR THE LIKE
Filed Dec. 4, 1939
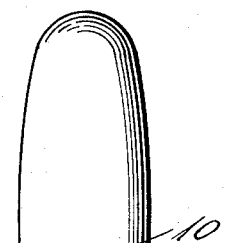
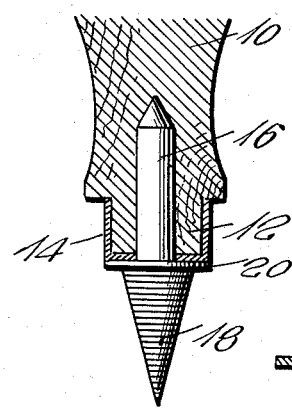
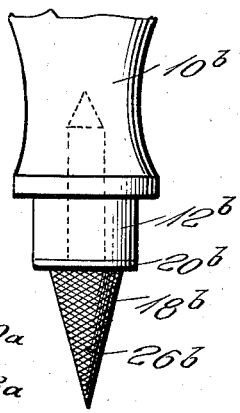
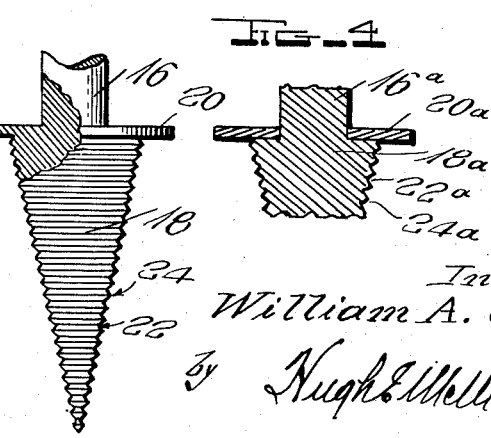
Inventor
William A. Coone,
by Hugh E. McMorrow
Attorney Patented Nov. 11, 1941

2,262,314

UNITED STATES PATENT OFFICE 2,262,314

DEVICE FOR PRODUCING VENTHOLES IN CANS OR THE LIKE

William A. Coone, Elgin, Ill.

Application December 4, 1939, Serial No. 307,537

5 Claims. (Cl. 30—16)

My invention relates to improvements in devices for producing ventholes in cans or the like and its general object is to provide a device of this character which will produce a circular venthole of any desired size, within the limitation of the diameter of the conical punching portion, and which is particularly adapted for use in connection with cans containing liquids, such as milk, fruit juices, beer, etc.

A further object of my invention is to provide a device of this character which is economical to manufacture, which is composed of few parts, which has no mechanism to get out of order, and which occupies very little storage space.

With these and other objects in view, as will hereinafter more fully appear and which will be more particularly pointed out in the appended claims, reference is now made to the accompanying drawing forming a part of this application, in which:

Fig. 1 is an elevational view, disclosing the preferred form of my improved device, showing its application to use;

Fig. 2 is an enlarged view, partly in section, of the lower portion of my device;

Fig. 3 is a greatly enlarged view, partly broken away, illustrating the annular lands and grooves of the puncturing cone;

Fig. 4 is a fragmentary enlarged sectional view, of a modification wherein the shoulder portion is separate; and Fig. 5 is an enlarged view of the lower portion of my device, wherein the puncturing cone is provided with a milled surface.

Referring now to the drawing in which similar reference characters represent similar parts, particular reference being made to Figs. 1, 2 and 3, my improved device comprises a handle portion 10, which may be of wood, metal, glass, any of the well known plastics, or any other appropriate suitable material. The handle 10 is provided with a reduced portion 12 adapted to receive an annular cap 14 of metal or the like. Cap 14 is provided with a circular opening through which the shank portion 16 of the conical punching portion 18 may be fitted into an annular recess in the lower end of the handle 10, where it may be glued, cemented, or otherwise firmly affixed. Interposed between the shank 16 and the top of the conical punching portion 18, and formed as an integral portion thereof, is an annular shoulder 20, of the same circumference as cap 14. The conical punching portion 18 is provided with a series of annular minute grooves 22 and corresponding minute lands 24, as clearly shown in Fig. 3, which is drawn on a greatly enlarged scale. The purpose of these lands and grooves is to retard or halt the movement of the device when in use, so that the puncturing movement may be stopped when a venthole of the desired diameter has been produced. It will be readily apparent that if the conical puncturing portion were smooth, as in all the devices of a similar nature of which applicant is aware, it being necessary to apply a considerable force to start the puncture, the movement cannot be stopped, or at least it is not feasible to stop the movement, until the shoulder of the device strikes the can. This results in large ventholes, whereas smaller holes are frequently desired. Such smaller holes can readily be made by the use of my improved device, since the movement, due to the retarding action of the successively larger lands and grooves, is momentarily halted or retarded as each successive land strikes the unopened surface of the can.

Referring now to the modification shown in Fig. 4, the shoulder 20—a is separate from the shank 16—a and conical puncturing portion 18—a and may be welded or otherwise suitably affixed to these portions. Forming the shoulder as a separate piece may be advisable to reduce manufacturing costs. The conical puncturing portion is provided with annular grooves 22—a and interposed lands 24—a, similar to those shown in Figs. 1, 2 and 3.

Referring now to the modification shown in Fig. 5, the parts are the same as shown in Figs. 1, 2 and 3 except that the surface of the conical puncturing portion 18—b is milled as indicated at 26—b. This milled surface serves to retard the puncturing movement, as heretofore explained, so that the movement may be halted at any desired point.

While I have illustrated and described the invention in some detail, it is to be understood that the invention is not to be limited to such details, but only by the spirit of the invention and the scope of the appended claims.

I claim:

1. A device for producing ventholes in cans or the like, comprising a handle, a conical punch affixed to the handle, the surface of the punch being provided with annular grooves and lands.

2. A device for producing ventholes in cans or the like, comprising a handle, a conical punch affixed to the handle, the surface of the punch being provided with annular grooves and lands, said lands and grooves being adapted to retard the device in its opening movement.

3. A device for producing ventholes in cans or the like, comprising a handle, a conical punch affixed to the handle, the surface of the punch being provided with a milled surface.

4. A device for producing ventholes in cans or the like, comprising a handle, a conical punch affixed to the handle, the surface of the punch being provided with a milled surface, said milled surface being adapted to retard the device in its opening movement.

5. A device for producing ventholes in cans or the like, comprising a handle, a conical punch affixed to the handle, the surface of the punch being provided with annular grooves and lands, said lands and grooves being adapted to halt at intervals the device in its opening movement.

WILLIAM A. COONE.